April 3, 1945. A. DE L. SINDEN 2,372,798

CONVEYER

Filed Jan. 19, 1942

Inventor
Alfred De Los Sinden
by J. Stanley Churchill
atty.

Patented Apr. 3, 1945

2,372,798

UNITED STATES PATENT OFFICE 2,372,798

CONVEYER

Alfred De Los Sinden, Aurora, Ill., assignor to Redler Conveyor Company, Quincy, Mass., a corporation of Massachusetts Original application March 2, 1940, Serial No. 321,968, now Patent No. 2,281,026, dated April 28, 1942. Divided and this application January 19, 1942, Serial No. 427,308

1 Claim. (Cl. 198—65)

This invention relates to a conveyer for conveying flowable solid material.

The object of the invention is to provide a novel and improved construction of conveyer which finds particular use in conveying lumpy materials and with which the liability of jamming the conveyer and injuring the component parts thereof is reduced to a minimum.

With this general object in view, and such others as may hereinafter appear, the invention consists in the conveyer and in the various structures, arrangements and combinations of parts hereinafter described and particularly defined in the claim at the end of this specification.

Figure 1:
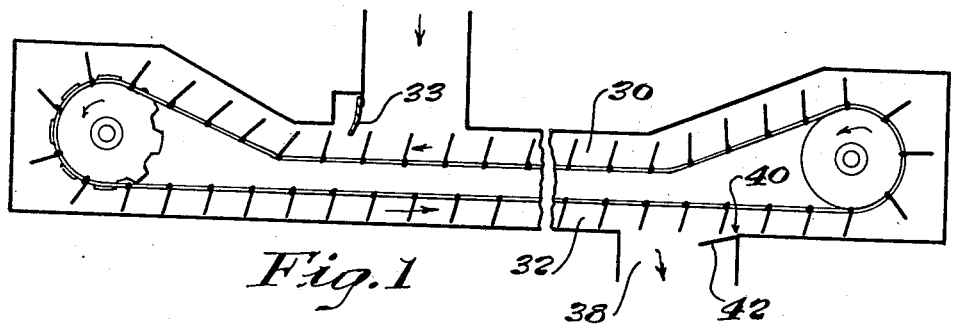
Figure 2:
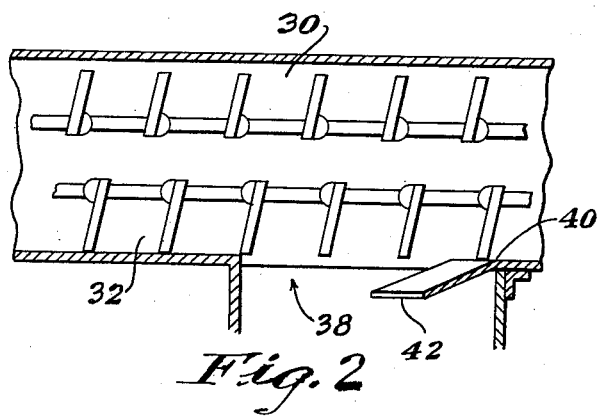

In the drawing, Fig. 1 is a more or less diagrammatic view in side elevation illustrating a conveyer embodying the present invention; and Fig. 2 is an enlarged detail in longitudinal section of a discharge portion of the conveyer shown in Fig. 1.

Prior to the present invention substantial difficulty has been encountered in handling certain types of lumpy flowable material in conveyers of the type embodying an elongated casing and a conveying element having spaced flights adapted to be drawn therethrough. Among such material may be mentioned crushed stone, coal, and other material containing lumps of a hardness such that, when wedged between the flights of the conveyer and the sharp edge of the conveyer casing forming the rear edge of the inlet or discharge opening therein, the flights oftentimes become broken or bent, or the conveyer stalled and rendered inoperative. The present invention contemplates novel and improved structures of the conveyer at the inlet and discharge sections thereof and different features of the invention find particular use in conveyers of the open flight type such as form the subject matter of the Redler United States Reissue Patent No. 18,445, while other features of the invention are particularly useful in connection with conveyers of the solid flight type, such for example as illustrated in the United States patent to White, No. 2,066,866.

Referring to the drawing, at the discharge opening 38 provision is made for preventing the lumpy material being conveyed by the solid flights of the lower run of the conveying element from being suddenly forced against the sharp edge 40 of the discharge opening 38 in the conveyer casing. Under ordinary operating conditions, the material is discharged without trouble, but in those instances where the outlet becomes choked, as in stoker feeds, liability exists of a hard lump becoming jammed between a flight and the rear edge 40 of the discharge opening. To prevent this jamming, I preferably provide a guide member 42 which is inclined downwardly from the discharge edge 40 in the manner illustrated and serves to cause any material being discharged thereon to ride up gradually as the conveyer flights continue to move past the edge 40 to be again returned onto the upper run of the conveyer and again delivered through the inlet down onto the lower run. In some instances, this discharge structure finds use in conveyers embodying open flights.

This application is a division of my co-pending application, Serial No. 321,968, filed March 2, 1940, and issued April 28, 1942, as Patent No. 2,281,026.

Having thus described the invention, what is claimed is:

A conveyer for conveying lumpy material comprising a substantially horizontal casing provided with an inlet and with an outlet from the bottom wall thereof, said outlet forming with the bottom wall sharp rectangular corners, an endless conveyer member adapted to be drawn through the casing with portions thereof disposed in proximity to the bottom walls and to a point beyond the discharge outlet, and a flat plate-like guide member projecting from the rear corner of the discharge outlet a substantial distance into the outlet and extending downwardly below the bottom wall of the casing into a position to engage and guide undischarged lumpy material and to cause the same to ride smoothly over said rear edge whereby to reduce to a minimum liability of jamming of the conveyer member.

ALFRED DE LOS SINDEN.